Feb. 5, 1963    M. BITZER    3,076,220
WINDSHIELD CLEANING SYSTEM
Filed Feb. 14. 1957    5 Sheets-Sheet 1

INVENTOR.
MARTIN BITZER
BY
Bean Brooks Buckley & Bean
ATTORNEYS

Feb. 5, 1963

M. BITZER 3,076,220

WINDSHIELD CLEANING SYSTEM

Filed Feb. 14, 1957

INVENTOR.
MARTIN BITZER
BY
Bean Brooks Buckley & Bean
ATTORNEYS

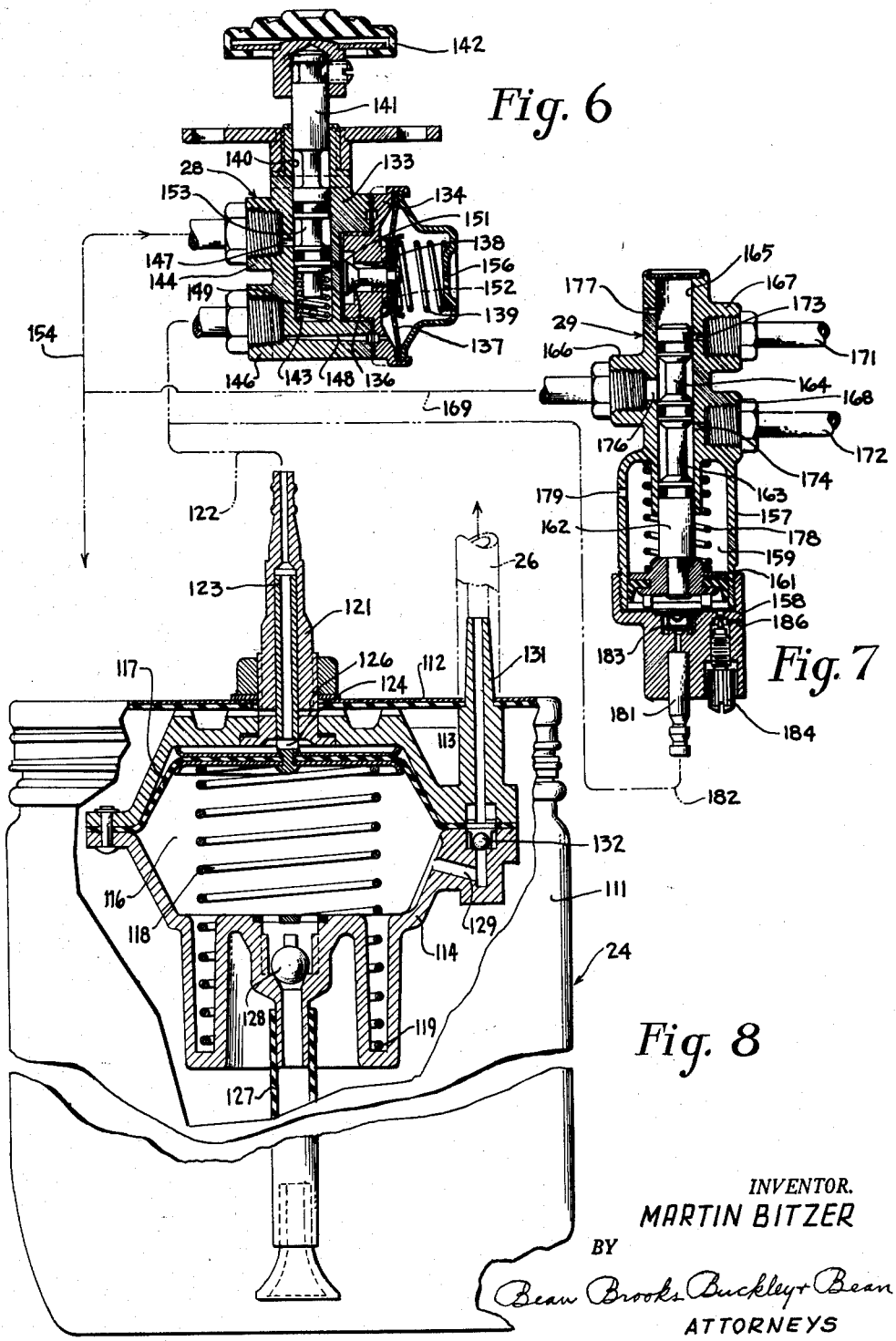

Feb. 5, 1963 M. BITZER 3,076,220
WINDSHIELD CLEANING SYSTEM
Filed Feb. 14, 1957 5 Sheets-Sheet 4

INVENTOR.
MARTIN BITZER
BY
Bean Brooks Buckley & Bean.
ATTORNEYS

Feb. 5, 1963  M. BITZER  3,076,220
WINDSHIELD CLEANING SYSTEM
Filed Feb. 14, 1957  5 Sheets-Sheet 5

INVENTOR.
MARTIN BITZER
BY
Bean Brooks Buckley & Bean
ATTORNEYS

United States Patent Office 3,076,220
Patented Feb. 5, 1963

3,076,220
WINDSHIELD CLEANING SYSTEM
Martin Bitzer, Kenmore, N.Y., assignor to Trico
Products Corporation, Buffalo, N.Y.
Filed Feb. 14, 1957, Ser. No. 640,112
7 Claims. (Cl. 15—250.02)

This invention relates to a vehicle windshield cleaning system, and more particularly to a washer arrangement for use with an air pressure operated wiper motor.

The present invention provides a system wherein a windshield washer arrangement is applied to a vehicle having an air pressure operated windshield wiper motor. A feature of the system resides in the coordinated operation of the washer with the wiper motor so that by simply pressing a control button the vehicle operator can initiate a complete windshield washing and wiping cycle. Another feature of the system of the invention resides in the provision of an air pressure regulating valve which will maintain constant operating pressure throughout a wide range of pressure variations in the air pressure source. Still another feature is the fact that an air pressure regulated valve is adapted for prolonging wiper motor operation for a predetermined time after cessation of windshield washing.

A further feature of the system of the invention resides in the fact that upon completion of the windshield washing-wiping cycle the wiper motor will be returned to its initial condition i.e., either it will be parked or will continue operating at the same speed it was prior to initiation of the washing-wiping cycle.

The main object of this invention is to provide a windshield washer-wiper system for use in a vehicle having an air pressure operated wiper motor.

Another object of this invention is to provide a windshield washer system for use with an air pressure operated wiper motor which may be used when the air pressure source is variable.

A further object of this invention is to provide a windshield washer system for use with an air pressure operated wiper motor wherein the washing and wiping operations are coordinated.

Another object of this invention is to provide a windshield washing-wiping system which will complete a windshield washing and wiping cycle initiated by simply pressing a control button.

These and further objects and features of the invention will become more apparent from the following description and the accompanying drawings wherein:

FIG. 6 is a section view of a control assembly used in the system illustrated in FIG. 1;

FIG. 7 is a section view of a valve used in the system of FIG. 1;

FIG. 8 is a section view of a reservoir used in the system of FIG. 1;

Figure 13:
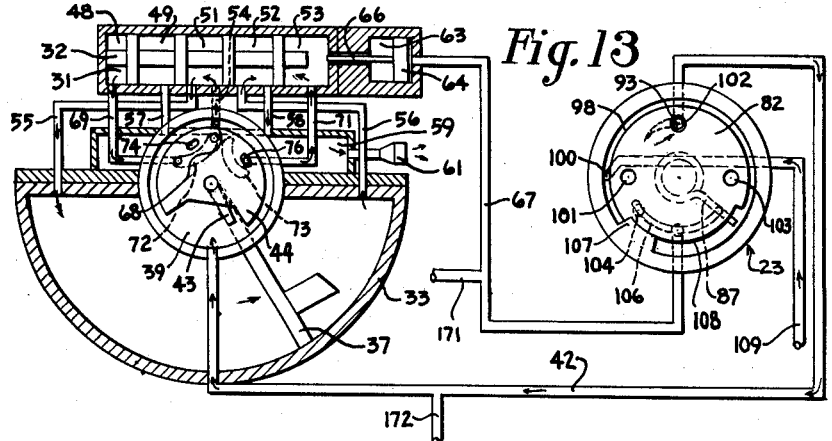
Figure 14:
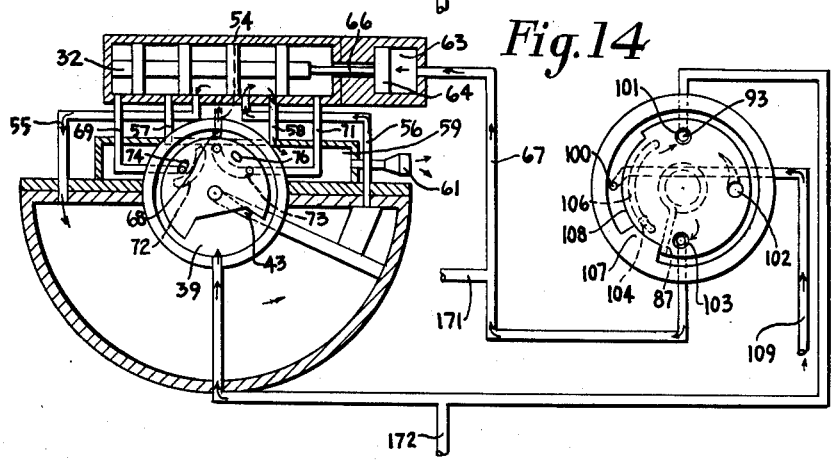
Figure 15:
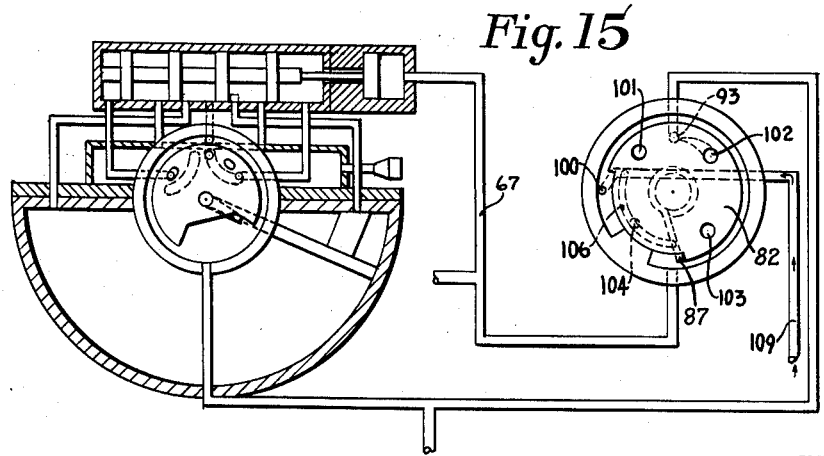

FIGS. 13, 14, and 15 are diagrammatic illustrations of the wiper motor and control valve during different phases of operation.

Figure 1:
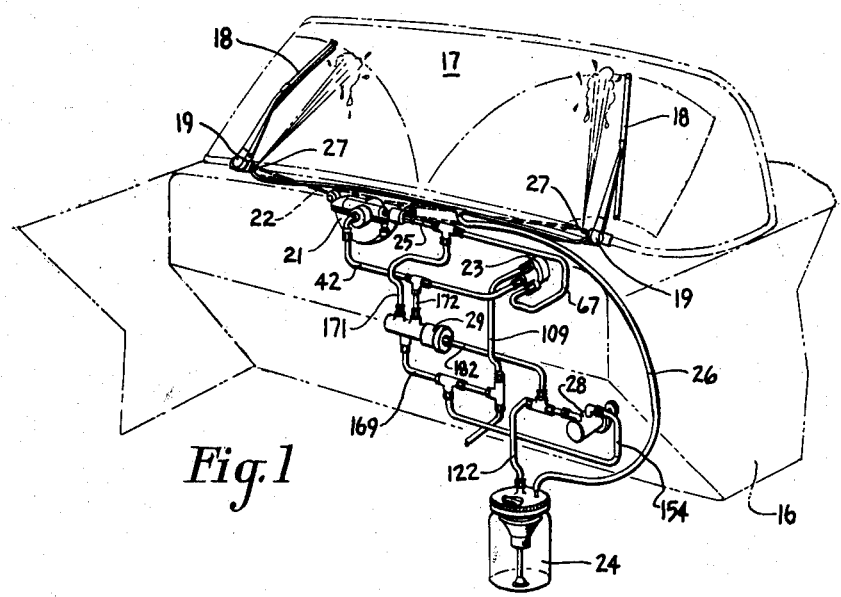
FIG. 1 is a fragmentary perspective view illustrating a windshield washer-wiper arrangement embodying the principles of the invention.
Figure 2:
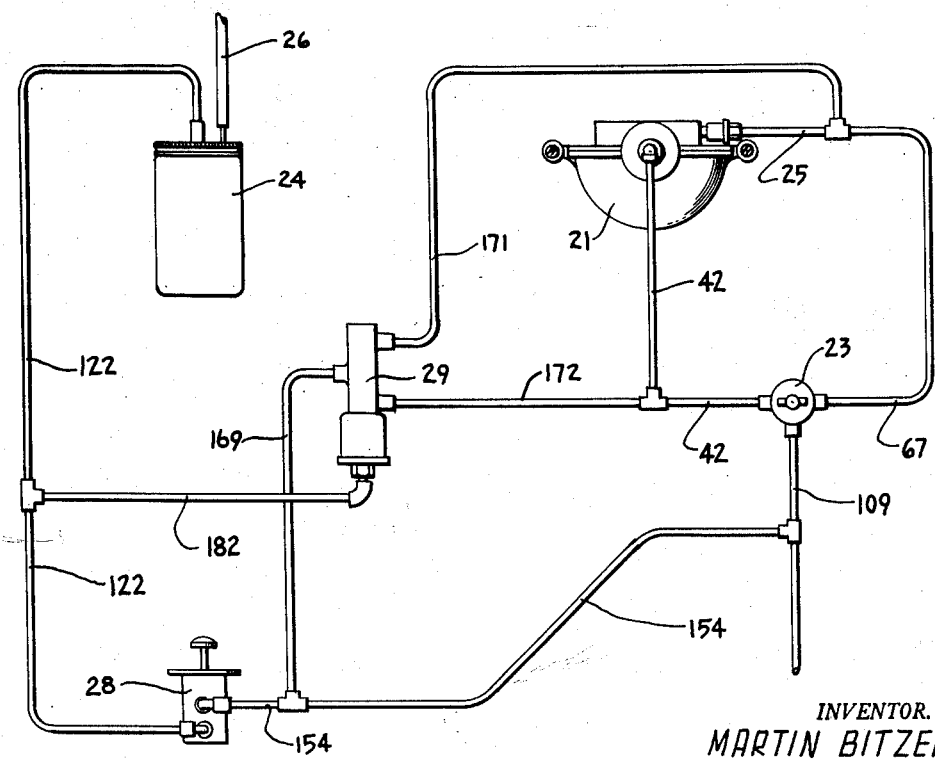
FIG. 2 is a schematic illustration of the washer-wiper system of FIG. 1.
Figure 3:
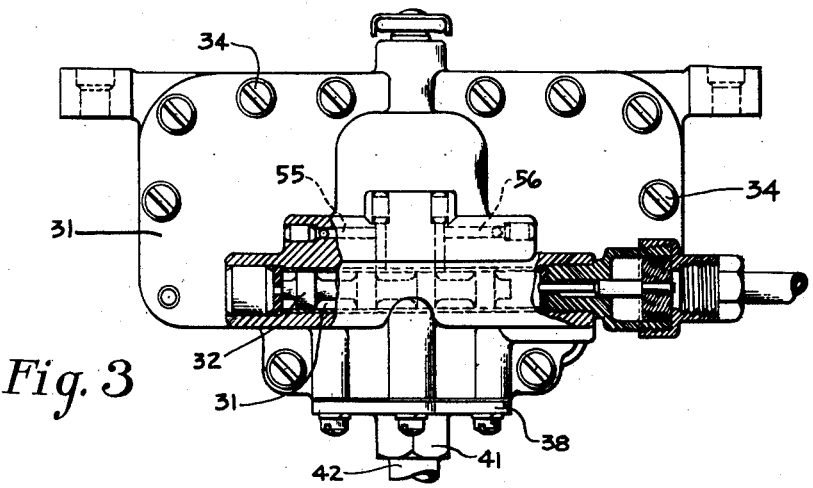
FIG. 3 is a plan view, partly in section, of the wiper motor of FIG. 1.
Figure 4:
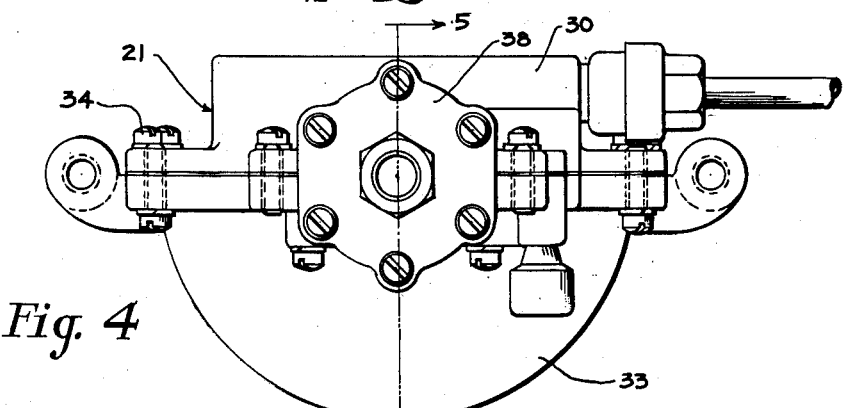
FIG. 4 is a front view of said wiper motor.
Figure 5:
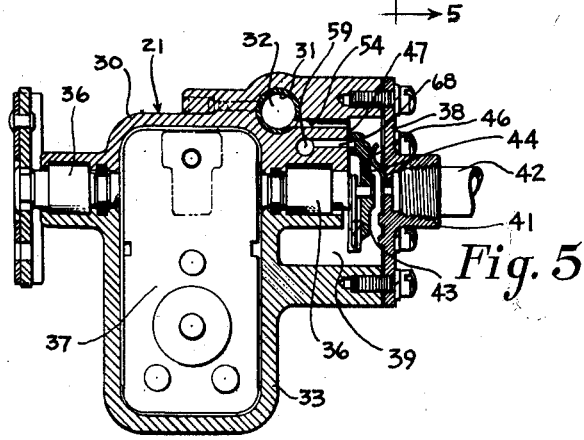
FIG. 5 is a section view as seen from line 5—5 in FIG. 4.
Figure 9:
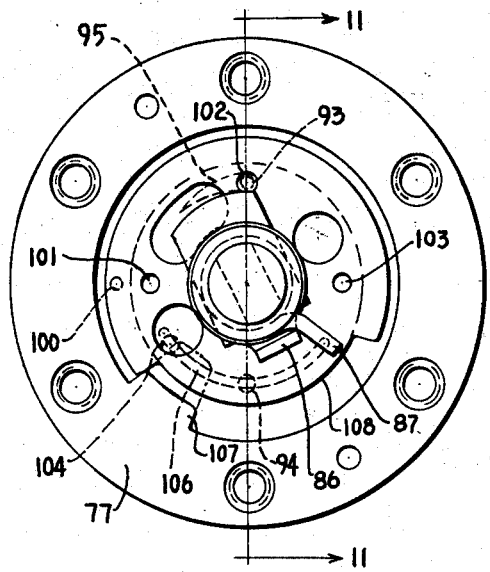
FIG. 9 is a plan view with cover removed of a wiper motor control switch used in the system illustrated in FIG. 1.
Figure 10:
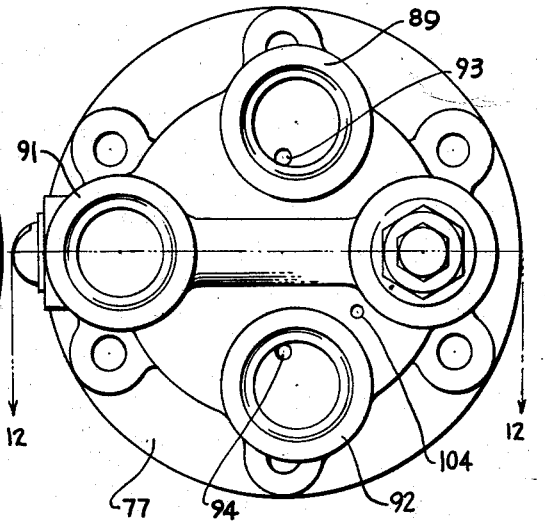
FIG. 10 is a bottom plan view of the control switch of FIG. 9.
Figure 12:
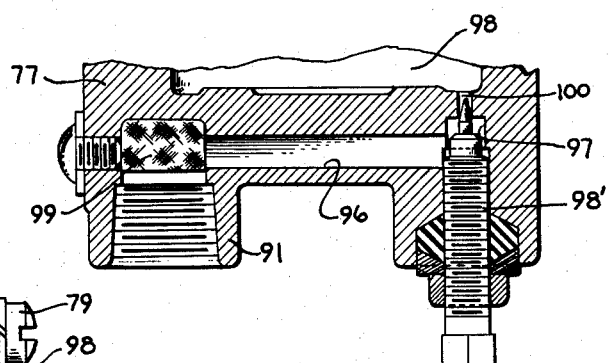
FIG. 12 is a section view as seen from line 12—12 in FIG. 10.

Referring now to the drawings and more particularly to FIG. 1, numeral 16 identifies a motor vehicle having a windshield 17 of the wraparound type, on which is arranged a pair of wiper blades 18 for oscillating movement thereupon, said wiper blades being mounted upon rockshafts 19 rotatable by an air powered wiper motor 21 by way of a flexible transmission such as cables 22. A motor control valve 23, is located for convenient manipulation by the vehicle operator.

A reservoir assembly 24 for storage of a quantity of cleaning liquid, is connected by a hose 26 to nozzles 27 which are arranged for directing a stream of cleaning liquid upon the windshield. A control element 28, located for convenient foot operation, or hand operation if desired, is adapted for initiation of a washing and wiping cycle in a manner presently to be described. Located in pneumatic circuits extending between control element 28, the control valve 23, and the wiper motor 21, is a coordinator assembly 29, which functions to provide coordinated windshield washing and wiping action.

The wiper motor 21 includes a cover portion 30 having a cylindrical chamber 31 arranged to contain a spool valve 32, and a motor chamber portion 33 of semi-circular shape and secured to the cover portion by fastening means such as screws 34. The cover portion and motor chamber portion have arcuate recesses for the support of a rotatable motor shaft 36 on which is secured a vane-type piston 37 arranged for oscillating movement within the motor chamber portion. A cover 38 encloses an air pressure chamber 39 which is formed on the side of the motor portions 30 and 33, said cover having a nipple 41 for receipt of an air hose 42 which conducts air under pressure into the chamber 39. Affixed to the shaft 36 is an arm 43, while rotatably supported on the extreme end of the shaft is a disc-like valve 44 which is arranged to be engaged by the arm 43 as the latter approaches a given angular position in either direction of rotation. A leaf spring 46, secured to the inside of cover 38, engages the valve 44 to maintain the latter in snug engagement upon a valve seating surface 47 provided upon an inner wall of the chamber 39.

Spool valve 32 includes a plurality of spaced discs as best seen in FIG. 13 providing volumes 48, 49, 51, 52 and 53, volumes 48 and 53 being of variable size depending upon the relative position of the valve 32 within the chamber 31, while volumes 49, 51 and 52 are of fixed size. A passageway 54 connects the air pressure chamber 39 with the cylindrical chamber 31 at a mid-point thereof, while passageways 55 and 56 extend from the mid-region of chamber 31 to the upper end areas of the motor chamber portion 33 to provide flow of pressure medium to opposite sides of the piston 37. The end of passageways 55 and 56 are arranged to open into the chamber 31 so that communication will be achieved between passageway 55 and passageway 54, or between passageway 56 and passageway 54 depending upon the position of the valve 32 within the chamber 31. A passageway 57 opens into the chamber 31 in the region of valve volume 49, while a passageway 58 opens into the chamber 31 in the region of valve volume 52, both passageways 57 and 58 being connected to an exhaust collector 59 which is exhausted to atmosphere by way of an exhaust silencer 61.

Concentrically arranged at one end of the cylindrical chamber 31, is a piston chamber 63 in which is slidably positioned a piston 64 having a stem 66 adapted for projecting into chamber 31 for engagement with the end of the valve 32. A hose 67 connects with the hose 25 to admit air under pressure to the end of the piston chamber 63 so that the piston 64 will be shifted resulting in the engagement of stem 66 with the end of the valve 32 to move the latter toward the left end of the chamber 31 for motor parking.

A passageway 68 leads from the valve seating surface 47 and connects with the collector 59, while a pair of passageways 69 and 71 lead from said valve seating surface to opposite ends of the chamber 31. Arranged on the back surface of the disc valve 44 are a pair of kidney-shaped grooves 72 and 73, groove 72 being arranged for connecting the passageways 68 and 69 in one rotary position of the valve, while groove 73 connects the passageways 68 and 71 in another rotary position of the valve. Holes 74 and 76, formed in the disc valve 44, are positioned for alignment with the ends of passageways 69 and 71 respectively, hole 74 being aligned with the end of pasasgeway 69 when the groove 73 interconnects passageways 68 and 71, while hole 76 aligns with the end of passageway 71 when the groove 72 connects the end of passageways 68 and 69.

Figure 11:
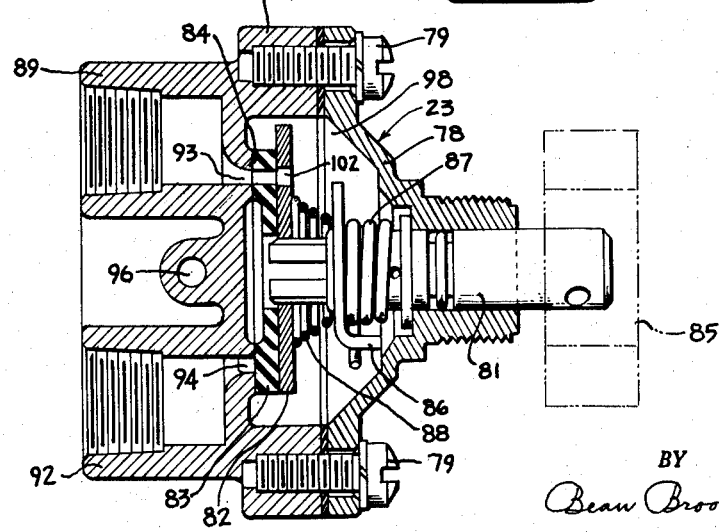
FIG. 11 is a section view as seen from line 11—11 in FIG. 9.

The control valve 23 includes a body portion 77, a cover 78 affixed to the body portion by fastening means such as screws 79, a rotatable shaft 81 supported by the cover 78, and a valve 82 arranged on the inner end of the shaft 81, which valve includes a rubber-like portion 83 of less diameter than that of valve 82, said portion 83 arranged for seating upon a valve seating surface 84 provided in the body portion 77. Secured to the end of the shaft 81 is a knob 85 for manually turning the shaft. An arm member 86 is affixed to the shaft 81, said arm member being arranged to engage one end of a torsion spring 87 mounted upon the shaft 81, the opposite end of the spring being secured to the shaft as best seen in FIG. 11. A conical spring 88 is compressively arranged between the arm member 86 and the valve 82 to maintain the valve portion 83 in tight engagement with the valve seating surface 84. Projecting from the rear surface of the body portion 77 are threaded nipples 89, 91 and 92, nipples 89 and 92 having holes 93 and 94 respectively, which open unto the valve seating surface 84. A passageway 96 extends from the nipple 91 to a needle valve chamber 97 in which is arranged a needle valve 98' adjustable for regulating flow of compressed air from the passageway 96 into a chamber 98 via passageway 100 in which is arranged the valve 82. A removable filter 99 may be placed in the bottom of the nipple 91 for straining the air as it flows into the passageway 96. The valve 82 has three holes 101, 102 and 103 which are arranged for alignment with holes 93 and 94, when the valve is in certain rotational positions. A tapered arcuate notch 95 extends from the hole 102 to provide graduated air flow to the wiper motor for speed control. A passageway 104 in the body portion 77, opens unto the valve seating surface 84 at one end, and on the outer surface of the body portion at the other end.

Arranged on the inner side of the valve portion 83 is a curved groove 106 positioned for connecting the hole 94 with the end of passageway 104 during certain rotative positions of the valve 82. Rotary motion of the valve 82 is limited by means of a projection 107 within the chamber 98, which projection extends into a recessed portion 108 formed on the periphery of the valve 82 whereby the ends of said recessed portion will abut the projection 107 to limit maximum rotary motion of valve 82 in either direction. Pipe 67 is attached to nipple 92, pipe 42 is attached to nipple 89, while a pipe 109 is attached to nipple 91 which serves to conduct air under pressure to the control valve 23 for wiper motor operation.

FIG. 13 illustrates the position of the valve 82 during wiper motor operation, a study of which will show that air under pressure flows from pipe 109 into the control valve chamber 98 via passageways 96 and 100, then into holes 102 and 93 and to the wiper motor air pressure chamber 39 via the hose 42. Air pressure in chamber 39 will enter pasageway 54, pass through the valve volume 51 into passageway 55, from whence it will flow into the motor chamber portion 33 to drive the piston 37 counter-clockwise as shown. The volume on the opposite side of piston 37 will be open to atmosphere via collector 59, the latter being vented to atmosphere as pointed out heretofore. It is to be noted that in such position of the valve 44, the variable volume 48 of the cylindrical chamber 31 will be open to atmosphere by way of passageway 69, groove 72, passageway 68, and collector 59. At the same time the variable volume 53 at the opposite end of the chamber 31, will be exposed to air pressure by virtue of the connection between 39 and variable volume 53 by way of hole 76 and passageway 71.

As the piston 37 approaches the end of the motor chamber, the arm 43 will engage the valve 44 and will rotate it so that the groove 73 will connect passageways 68 and 71, and simultaneously will align the hole 74 with the end of passageway 69. In such rotary position of the valve 44 it will be seen that variable volume 48 will be exposed to air pressure from the chamber 39, while variable volume 53 will be open to atmosphere via passageway 71, groove 73, passageway 68, and collector 59. As a result thereof, the valve 32 will be shifted toward the right end of the chamber 31 to establish pneumatic circuits resulting in movement of the piston 37 in clockwise direction. More particularly, it will be seen that air under pressure will flow from chamber 39 into passageway 54, through volume 51, into passageway 56 and enter the motor chamber portion 33 to act upon the side of the piston 37, while at the same time the volume on the opposite side of the piston will be open to atmosphere via collector 59. Movement of the piston in the clockwise direction will eventually cause a reshifting of the valve 44 to the position shown in FIG. 13 to establish pneumatic circuits resulting in the counter-clockwise movement of the piston 37.

Motor operation as above described will continue as long as the valve 82 remains in the position illustrated in FIG. 13. To terminate wiper motor operation the vehicle operator turns the valve 82 by means of the knob 85 to the rotated position illustrated in FIG. 14. In such position of the valve it will be seen that air pressure will pass from the chamber 98 through hole 103 and into pipe 67 to act upon the side of piston 64 within the chamber 63. As a result the piston 64 will be shifted whereby stem 66 will engage the end of the valve 32 and move it toward the left end of the chamber 31. In such position of the valve 32 air under pressure will flow into the motor portion 33 to cause counter-clockwise movement of the piston 37. When the piston 37 approaches the end of its counter-clockwise movement, the valve 44 will be rotated, however, the spool valve 32 will not be shifted because the pressure on each end of the valve will be balanced thus preventing establishment of circuits necessary to cause clockwise rotation of the piston 37, as heretofore explained. Air under pressure will be delivered to chamber 39 during wiper motor parking by reason of the fact that hole 101 will be in alignment with hole 93. During wiper motor parking, it is necessary that the vehicle operator hold the knob 85 long enough to complete motor parking which, of course, is but a very brief period of time.

Upon release of rotative force upon the knob 85, the spring 87, which had been tensioned during parking operation, will act upon the arm 86 to rotate the valve 82 to the position illustrated in FIG. 15. In such position of the valve 82, it will be seen that the piston parking chamber 63 will be open to atmosphere via pipe 67, curved groove 106, and passageway 104, while at the same time flow of air will be cut off to the wiper motor by the misalignment of the hole 101 and hole 93. Upon turning the knob 85 for wiper motor operation, the wiper motor valve 44 will be in such position as to cause shifting of the spool valve 32 toward the right end of chamber 31 to establish pneumatic circuits resulting in the clockwise movement of the piston 37. Such movement of the spool valve 32 will cause a shifting of the piston 64 toward the right end of the chamber 63 which had been depressurized as above described.

Reservoir assembly 24 includes a jar 111 having a cover 112 to which is affixed a pump unit comprising an upper housing 113 and a lower housing 114, said housings formed to provide a cavity 116 in which is positioned a flexible diaphragm 117 separating the cavity into a water portion below the diaphragm and an air portion above the diaphragm. A compression spring 118 is arranged within the cavity 116, the upper end of the spring engaging the lower side of the diaphragm while the lower end of the spring engages a seat 119 formed in lower housing 114. A stem 121 is affixed to the upper housing 113 and projects above the cover 112 for receipt of an air hose 122. A tubular valve 123 is slidably arranged within the stem 121, the lower end of the tubular valve being affixed to the diaphragm 117. Tubular valve 123 has horizontal openings 124 to permit flow of air from the hose 122 into the chamber 116 above the diaphragm 117. Radial holes 126 are formed in the stem 121 just below the cover 112, so that air flow from the hose 122 will pass in part into the reservoir above the water level therein when the tubular valve 123 moves downwardly to uncover the radial holes 126. When this occurs, the air pressure in the chamber 116 above the diaphragm 117 will be reduced, permitting the spring 118 to move the diaphragm upwardly in the chamber.

A water intake tube 127 is secured to the lower housing and extends downwardly into the jar 111 for conduction of water upwardly in the chamber 116. A ball-type check valve 128 is arranged to permit the one-way flow of liquid from the intake tube into the chamber. A passageway 129 leads from the water portion of the chamber 116 and upwardly through a stem 131 projecting above the cover 112, said stem being arranged for receipt of the hose 26. A ball-type check valve 132 is arranged in the passageway 129 to allow one-way flow of liquid upwardly into the hose 26. An operating cycle of the reservoir assembly consists of downward movement of the diaphragm under air pressure to eject the liquid from chamber 116 into passageway 129 and past the check valve 132 into the hose 26. As the end of the tubular valve 123 uncovers the radial holes 126, downward movement of the diaphragm will cease and the spring 118 will expand to move the diaphragm to recharge the chamber 116 with liquid flowing upwardly in the tube 127 past the check valve 128. The operating cycle of the reservoir assembly consists of one liquid ejection and recharge each time the control element is operated, as will be more apparent hereinafter.

Control element 28 comprises a main body portion 133 to which is affixed a pressure regulating valve portion 134 containing a valve 136 one end of which is affixed to a diaphragm 137 the opposite end of which is arranged for seating on the edge of passageway 138. A spring 139 is compressively arranged to normally maintain the valve 136 away from seating engagement upon the end of passageway 138. Slidably supported within the main body portion 133 in a bore 140, is a valve 141 the outer end to which is affixed a pedal 142 against which the vehicle operator pushes to move the valve 141 downwardly in the body portion 133 against the compressive force of a spring 143.

Projecting from the side of the main body portion 133 are pipe receiving nipples 144 and 146, the former of which has a passageway 147 opening into the bore 140, while the latter has a passageway 148 which opens into the pressure regulating valve portion 134 on the inner side of the diaphragm 137. A passageway 149 exhausts the lower end of the bore 140 to atmosphere while a passageway 151 extends from the bore 140 to the region about the valve 136. A plurality of grooves 152 are provided in the valve portion 134, which grooves are arranged about the stem of the valve 136 so that air flow can pass from the passageway 151, about valve 136 and into the passageway 148. The valve 141 has a reduced portion 153, which allows air flow from passageway 147 into passageway 151 when the valve 141 is shifted downward within the bore 140. Upon release of axial pressure upon the valve 141, the spring 143 will move the valve so that passageway 151 will be uncovered to allow reverse flow of air from passageway 148, through grooves 152, about the valve 136, and into passageway 151, from whence the air will flow into bore 140 and be released to atmoswhere through passageway 149. Nipple 146 receives the end of hose 121, while nipple 144 receives the end of a hose 154 which is connected to a source of compressed air by way of pipe 109. A vent 156 is arranged in the valve portion 134 to maintain atmospheric pressure on the spring loaded side of the diaphragm 147.

Coordinator assembly 29 includes a main body portion 157 to which is threadably secured an end portion 158 said main body portion having a chamber 159 in which is slidably arranged a piston 161, the latter being attached to a valve stem 162 slidably positioned in a bore 165, and having reduced portions 163 and 164. Pipe receiving nipples 166, 167 and 168, are arranged to receive the end of pipes 169, 171 and 172 respectively. Pipe 169 connects at the other end with pipe 154, pipe 171 connects at the other end with a pipe 25, while pipe 172 connects at the other end with pipe 42. A passageway 173 is arranged in the bottom of the pipe receiving nipple 167 to permit air flow from bore 165 into the pipe 171, while a passageway 174 is formed in the bottom of pipe receiving nipple 168 to allow flow of air from the bore 165 into the pipe 172. The pipe receiving nipple 166 has a passageway 176 to allow air flow from the pipe 169 into the bore 165, while a passageway 177 vents the upper end of the bore 165 to atmosphere. A spring 178 is compressively arranged between the piston 161 and the end of chamber 159, while a hole 179 vents the chamber on the spring loaded side of the piston, to atmosphere. A nipple 181 is arranged in the end portion 158 for receipt of a hose 182 provided for flow of air under pressure into the chamber 159 to move the piston 161 against the spring 178 to compress the latter. A spring loaded flap valve 183 is arranged to allow one-way flow of air from the hose 182 into the chamber 159. Threadably arranged in the end portion 158 is a needle valve 184 which may be adjusted to regulate venting of compressed air from chamber 159 to atmosphere by way of a hole 186.

In the non-operative position of piston 161, it will be seen that compressed air coming into the bore 165 by way of passageway 176, will be entrapped in the reduced diameter mid-portion of the valve stem 162, while the passageways 173 and 174 will be blocked preventing air flow from the bore 165. As compressed air is admitted into the chamber 159 by way of hose 182 to move the piston 161 and compress the spring 178, it will be seen that the mid-portion 164 of the valve stem will briefly interconnect passageways 176 and 173, to allow compressed air flow in the pipe 171. Continued movement of the valve stem will disrupt communication between passageways 176 and 173 and will create communication between passageways 176 and 174 by way of the reduced mid-portion 163 thus permitting compressed air flow to pipe 172. Air flow in pipe 171 will result in the shifting of parking piston 64 of the wiper motor, thus assuring placement of the spool valve 32 to provide wiper motor operation. Compressed air flow in pipe 172 will enter the air pressure chamber 39 of the wiper motor thereby providing power for wiper motor operation.

To initiate a washer and wiper cycle the vehicle operator merely depresses the pedal 142 whereupon compressed air will flow from hose 154 through passageway 147, about the reduced portion 153 of the valve 141, then through passageway 151, about the valve 136, through grooves 152, and passageway 148 and into hose 122. Compressed air will flow from the hose 122 into the reservoir pump unit entering the cavity 116 above the diaphragm 117 causing a downward movement of the latter to force the liquid below the diaphragm into passageway 129, upwardly into the hose 26, from whence it will be sprayed upon the windshield by way of spray nozzles 27. Simultaneously, part of the air flowing in hose 122 will pass into the hose 182 and enter the chamber 159 of the coordinator assembly 29. When this occurs the piston 161 will be moved so that compressed air from pipe 169 will sequentially pass into pipes 171 and 172 to begin wiper motor operation as heretofore described.

Upon termination of liquid spraying upon the windshield, which occurs upon completion of downward movement of the pump diaphragm 117, the motor vehicle operator will release axial pressure upon the pedal 142, whereupon the spring 143 will return the valve 141 to non-operative position as illustrated in FIG. 6. In such position of the valve 141, the hoses 122 and 182 will be vented to atmosphere by way of passageway 148, which will be in communication with the passageway 149, as was above described. Subsequently, the spring 178 of the coordinator assembly 29 will urge the piston in the direction of the end portion 158 to force the air from the chamber 159 by way of the needle valve 184 and the hole 186. Such return movement of the piston 161 may be adjusted so that wiper motor operation will continue for a preset time after completion of the spraying operation.

From an understanding of the foregoing description of the system of the invention, it will be seen that a windshield washer and wiper system may be provided in a vehicle having an air pressure operated wiper motor. It will be further seen that the system of the invention will allow for initiation of a complete washer and wiper cycle by the simple manipulation of a foot actuated pedal. In addition, it will be seen that the washer-wiper cycle can be initiated irrespective of the operating condition of the wiper motor, that is to say, wiper motor operation will be assured as soon as liquid spraying begins, and the wiper motor will be either parked or returned to original operating speed after completion of a washing and wiping cycle.

The system of the invention thus provides a convenient manner for cleaning a vehicle windshield with a minimum of attention or distraction on the part of the vehicle operator, thereby contributing to the safe operation of the vehicle.

The foregoing description has been given in detail without thought of limitation since the inventive principles involved are capable of assuming other physical embodiments without departing from the spirit of the invention and the scope of the appended claims.

What is claimed is:

1. A vehicle windshield cleaning system comprising in combination a source of above-atmospheric fluid pressure, a fluid pressure operated wiper motor adapted to be driven from said source, a reservoir for holding a supply of windshield cleaning liquid, a fluid pressure operated pump mechanism actuated from said source and adapted for ejecting cleaning liquid upon the windshield, first control means for providing sole operation of the wiper motor, second control means for providing joint operation of the pump mechanism and said wiper motor, means for reducing the pressure of fluid supplied to said wiper motor and said pump, said second control means including coordinating means for providing a period of joint wiper motor and pump operation with automatic termination of pump operation prior to termination of wiper motor operation.

2. A vehicle windshield cleaning system comprising in combination a source of above-atmospheric fluid pressure, a fluid pressure operated wiper motor, a reservoir for holding a supply of windshield cleaning liquid, said reservoir having a fluid pressure operated pump mechanism adapted for ejecting a quantity of cleaning liquid upon the windshield, a manually operable control means for the control of the wiper motor, a foot operated control means for actuation of the pump mechanism, means for regulating the pressure of fluid supplied to said pump mechanism from said source, and a coordinator responsive to actuation of the foot operated control means to provide a period of joint operation of the pump mechanism and the wiper motor, said coordinator having fluid pressure operated means adapted to be energized from said source for prolonging wiper motor operation after liquid spraying is completed.

3. A vehicle windshield cleaning system comprising in combination a source of above-atmospheric air, an air pressure operated wiper motor, a reservoir for holding a supply of windshield cleaning liquid, said reservoir having an air pressure operated pump mechanism adapted for ejecting an automatically measured quantity of cleaning liquid for spraying upon the windshield, a manually operable control means for the control of the wiper motor, a foot operated control means for actuation of the pump mechanism, means for maintaining air pressure supplied to said pump constant, and a coordinator responsive to action of the foot operated control means to coordinate operation of the pump mechanism and the wiper motor, said coordinator having air pressure operated means adapted to prolong wiper motor operation after liquid spraying is completed.

4. A vehicle windshield cleaning system comprising in combination a source of above-atmospheric air pressure, an air pressure operated wiper motor, a reservoir for holding a supply of windshield cleaning liquid, an air pressure operated pump mechanism adapted for ejecting cleaning liquid from said reservoir onto the windshield, first control means for actuating the wiper motor to provide sole operation thereof, second control means for providing a period of joint pump and wiper motor operation, air pressure controlled means for providing automatic termination of pump operation prior to wiper motor operation, and pressure regulating means for maintaining the air pressure supplied to said pump and said wiper motor constant.

5. A vehicle windshield cleaning system comprising a windshield wiper, a fluid pressure wiper motor, linkage means coupling said wiper motor to said wiper, a source of fluid under pressure, a solvent reservoir, a solvent pump, first conduit means including valve means for selectively causing communication between said fluid pressure source and said pump, nozzle means, second conduit means for coupling said pump to said nozzle means, pressure regulating means for causing fluid from said source to be supplied to said pump at a pressure which is lower than the pressure of said source, pressure responsive means for initiating operation of said wiper motor after said valve means are actuated and for maintaining said wiper motor in operation for a predetermined time after said valve means are deactuated, said pressure responsive means comprising a housing having a first port in communication with said fluid pressure source, a valve arrangement in said housing, a second port for selectively causing said wiper motor to communicate with said fluid pressure source in response to said valve arrangement being in a first position, and a third port in said housing for causing said fluid pressure source to communicate with a wiper motor parking mechanism in response to said valve arrangement being in a second position, the positions of said valve arrangement being responsive to the position of said valve means.

6. An arrangement as set forth in claim 5 wherein said valve means and said pressure regulating means are contained within a single housing and wherein said single housing includes means for maintaining the pressure to said pump at a substantially constant value.

7. A vehicle windshield cleaning system for use with a source of above atmospheric fluid pressure comprising a wiper motor, a reservoir for holding a supply of windshield cleaning liquid, means for reducing the pressure of said fluid, a fluid pressure operated pump mechanism adapted to be actuated by said reduced fluid pressure for ejecting cleaning liquid upon a windshield, first control means for providing sole operation of said wiper motor, second control means for providing joint operation of said pump mechanism and said wiper motor, said second control means including coordinating means actuable by reduced fluid pressure for providing a period of joint wiper motor and pump operation with automatic termination of pump operation prior to termination of wiper motor operation.

References Cited in the file of this patent
UNITED STATES PATENTS

| | | |
|---|---|---|
| 386,043 | Timlin et al. | July 10, 1888 |
| 1,348,604 | Titus | Aug. 3, 1920 |
| 1,929,643 | Landerberger | Oct. 10, 1933 |
| 2,095,833 | Rockwell | Oct. 12, 1937 |
| 2,293,542 | Hamilton | Aug. 18, 1942 |
| 2,712,147 | Olin | July 5, 1955 |
| 2,737,202 | Baldwin | Mar. 6, 1956 |
| 2,743,473 | Oishei | May 1, 1956 |
| 2,860,362 | Riester | Nov. 18, 1958 |